United States Patent
Banning et al.

(10) Patent No.: US 6,615,300 B1
(45) Date of Patent: Sep. 2, 2003

(54) FAST LOOK-UP OF INDIRECT BRANCH DESTINATION IN A DYNAMIC TRANSLATION SYSTEM

(75) Inventors: John Banning, Sunnyvale, CA (US); Brett Coon, Milpitas, CA (US); Linus Torvalds, Santa Clara, CA (US); Brian Choy, San Jose, CA (US); Malcolm Wing, Menlo Park, CA (US); Patrick Gainer, San Jose, CA (US)

(73) Assignee: Transmeta Corporation, Santa Clara, CA (US)

( * ) Notice: Subject to any disclaimer, the term of this patent is extended or adjusted under 35 U.S.C. 154(b) by 388 days.

(21) Appl. No.: 09/596,279

(22) Filed: Jun. 19, 2000

(51) Int. Cl.$^7$ .............................. G06F 9/06; G06F 9/45; G06F 15/00
(52) U.S. Cl. ..................... 710/100; 711/118; 711/202; 712/205
(58) Field of Search .................. 710/100; 709/203; 703/26, 27; 712/1, 208, 227, 205, 213, 237, 233; 717/138; 711/3, 202, 206, 118, 119, 203

(56) References Cited

U.S. PATENT DOCUMENTS

| | | | | |
|---|---|---|---|---|
| 4,722,050 A | * | 1/1988 | Lee et al. | |
| 5,737,590 A | * | 4/1998 | Hara | |
| 5,796,989 A | * | 8/1998 | Morley et al. | |
| 5,819,063 A | * | 10/1998 | Dahl et al. | |
| 6,031,992 A | * | 2/2000 | Cmelik et al. | |

* cited by examiner

Primary Examiner—Gopal C. Ray
(74) Attorney, Agent, or Firm—Wagner, Murabito, & Hao LLP

(57) ABSTRACT

Dynamic translation of indirect branch instructions of a target application by a host processor is enhanced by including a cache to provide access to the addresses of the most frequently used translations of a host computer, minimizing the need to access the translation buffer. Each entry in the cache includes a host instruction address, a logical address of the instruction of the target application, the physical address of that instruction, the code segment limit to the instruction, and the context value of the host processor associated with that instruction, the last four named components constituting tags to the host instruction address, and a valid-invalid bit. In a basic embodiment, the cache is a software cache apportioned by software from the main processor memory chips.

15 Claims, 3 Drawing Sheets

FAST LOOK-UP OF INDIRECT BRANCH DESTINATION IN A DYNAMIC TRANSLATION SYSTEM

FIELD OF THE INVENTION

This invention relates to an improvement in digital processors (the "host processors") that dynamically translate instructions of a computer application program (the "target application") designed for processing by a digital processor (the "target processor") that functions with a different instruction set than the instruction set of the host processor, executing the translated instructions in real time to carry out the purpose of the target application, and, more particularly, relates to a new method and apparatus for processing of indirect branch instructions of the target application to reduce latency in processing by the host processor.

BACKGROUND

A unique digital processing system is described in U.S. Pat. No. 6,031,992, granted Feb. 29, 2000, entitled Combining Hardware and Software to provide an Improved Microprocessor, assigned to Transmeta Corporation, (referred to as the '992 Transmeta patent), the content of which is incorporated by reference herein in its entirety. The Transmeta processor serves as the host processor capable of executing software programs, the target application, designed with an instruction set intended to run on a processor of different design, the "target" processor, that contains an instruction set unique to the target processor, but different from that of the host processor. The present invention improves upon the host processor and, hence, the host processing system.

The microprocessor of the '992 Transmeta patent is formed by a combination of a hardware processing portion (sometimes called a "morph host"), and a software portion, referred to as "code morphing software." Among other things, the code morphing software carries out a significant portion of the functions of digital processors in software, reducing the hardware required for processing, and, hence, reducing power consumption. The morph host processor executes the code morphing software which translates the target application programs dynamically into host processor instructions that are able to accomplish the purpose of the original software. As the instructions are translated, they are stored in a translation buffer where they may be subsequently accessed and executed, as needed, during continued program execution without further translation.

A set of host registers (in addition to normal working registers) is included in the Transmeta processor. The host registers store "state" (also referred to as "context") of the target processor which exists at the beginning of any sequence of target instructions being translated. In one embodiment, the results of translations are held in a gated store buffer until the translations execute. If the sequence of translated instructions execute without raising an exception the results are stored in memory by a commit instruction. Further, the registers holding the target state are updated to the target state at the point at which the results from the sequence of translated instructions was committed. The information contained in those registers are used to advantage in the present invention as a "tag" for a translation.

The '992 Transmeta processor is capable of processing target applications programs designed for other processors. Application programs contain indirect branch instructions, in which the instruction execution requires the processor to "branch" to a specified address (in memory) and execute the instruction found at that address before returning to process the next instruction of the application program. When that branch address is not known, that is, is not included in the branch instruction, the branch instruction is referred to as "indirect". The latter is the type of instruction with which the present invention is principally concerned. Thus, any reference herein to a branch instruction should be understood to refer to an indirect branch instruction, unless the text expressly states to the contrary.

Given that the branch address is not initially known, to complete execution of the branch instruction, the processor must first calculate or otherwise determine the unknown branch target address. The processor makes the calculation, determines the branch address, jumps to that address and executes the instruction found at that address.

In processors that include a memory "stack" and "call" and "return" instructions, the return instruction constitutes one important class of indirect branch instruction. The call instruction constitutes a kind of branch. To transfer the flow of the application program to the procedure, such as a subroutine, to which a jump is made, the target processor employs the CALL instruction. Then to return to the program following the execution of a branch instruction (and any other intervening instruction executions, as may include additional call and return instructions (called a nested branch), as example, that target processor employs the RETURN instruction.

When a CALL is made, the return address of the next instruction of the application program is saved in a memory stack (e.g. is "pushed" onto the stack) so that the flow of the program may continue later, when a RETURN instruction is executed. The RETURN instruction in turn "pops" the next instruction address of the target application off of the stack, and that succeeding instruction is then executed by the target processor (e.g. the processor jumps to that address and executes the instruction). That combination of software and hardware of the target processor reduces the latency in obtaining the next instruction of the program for execution.

When an indirect branch instruction of an application program intended for operation in a target type system is to be executed by the host Transmeta processor, in order to correctly translate that branch instruction into instructions of the host processor, the host must not only generate code to perform the effect of the branch instruction, but must also generate code to determine the address of the translation of the target of the branch. Thus in order for the host processor to execute the target branch instruction, the target program address and other target processor state information that was earlier saved by the host processor must be converted into the address of a corresponding translation followed by a transfer of control of the host processor to that translation.

A translation corresponds to a target address if the execution of the (machine language) code in the translation has the same effect on the state of the target processor stored in the context registers of the host processor as would be caused by a target processor executing that same target processor code. The host processor also associates additional information with each translation, called "tags". One tag may contain information of the state of the target processor at the time the translation was made, as example, and other tags will contain other information, as later herein described. Those tags may be used to enable the processor to later identify (and, as appropriate, retrieve) the particular translation when again needed.

To find a pre-existing translation (e.g. host instruction) of an instruction address of the target processor, the host processor first searches (e.g. "looks") through the translation memory, the library of translations stored in a memory earlier referred to, to find a translation whose tags match the current target state. As example, that memory may contain tens of thousands of translations. A conventional approach to efficient searching of the translation buffer is to establish an index of the stored information, known as a hash table, to make the search easier to accomplish. A hash table or "hashing" is the creation of an index to the table content that is derived from a transformation of the information stored. As example, see Schildt, "C: The Complete Reference", third edition, Osborne-McGraw-Hill Ch 21 p 587 (1995). In practice one finds that searching a physical memory of the processing system in that way or any other way that requires searching through all translations is slower than desired because of the great number of system clock cycles required to accomplish the search and the volume of translations that is stored. Those familiar with the Transmeta processor refer to such a search as a slow look-up.

In other processing systems of the prior art a cache is used to hold data and/or instructions that are used frequently during the processing of an application program. By first looking for required data or instructions being sought in the cache, processing of the program being run proceeds more quickly should that information be found in the cache than when access must be made to the main memory for that information. Those prior caches may be software caches, hardware caches or combinations of the two types of caches. The present invention also takes advantage of a cache for translations of target application instructions, or more precisely, the address of such translations. The adaptation of a cache to the translation process of the host computer involves the application and caching of the translation "tags" required by the host processor, as becomes apparent from the detailed description of the invention which follows.

On inspection of the operation of the Transmeta processor, the skilled person finds that each translation of a target instruction is accompanied by four different pieces of information, referred to as tags. One tag is the extended instruction pointer (the "eip") of the target application, which is the logical address of the target instruction contained in the target application. Another tag is the physical instruction pointer of the target application instruction (the "Phys-ip"), which is the physical address of such instruction (in a memory of a target processor). The Phys-ip value is derived from the logical address by a simple calculation made by the target processor and is the means of equating an address used by the software programmer with an actual physical location in memory of the target system.

A third tag is the "state" or "context" of the target processor being emulated by the host processor. As earlier noted, a number of working registers of the Transmeta (e.g., host) processor contain data indicative of the condition of the target processor, called state or context. That data provides a snapshot of the condition of the target processor. A more detailed description of context may be found in the co-pending application of D. Keppel, Ser. No. 09/417,981, filed Oct. 13, 1999, entitled Method and Apparatus for Maintaining Context While Executing Translated Instructions.

Prior to translation of a target instruction, the data in the foregoing working registers reflects the context of the target processor, as maintained by the host processor. When a target instruction is successfully translated and executed by the host processor, the data in those registers is updated as a side effect to the successful instruction execution. The data stored in the registers hence depicts the new context of the X86 processor. Among other things, that context information may be used by the host processor as a verification of the correctness of a translation during subsequent processing.

When a target instruction is successfully translated by the host processor during the processing of a target application, the translation is saved (stored) in a translation memory for re-use later during further processing of that application program. At the time the translation is made, the working registers of the host processor stores the assumed "state" or "context" of the target processor that is being dynamically translated by the host processor. That context information is saved along with the translation to ensure that the circumstances in the host processor are the same as before to ensure that the translation, if later accessed for use in processing, will correctly execute.

A fourth tag is the code segment limit of the target instruction (the "CS-limit"). The CS limit is an appendage to instructions found in the target application. The value specifies a maximum size of memory that the target instruction should not exceed and serves as a check on the integrity of the target instruction. Should an instruction exceed that size, an error condition results.

Accordingly, an object of the invention is to reduce latency in the dynamic translation by the host system of indirect branch instructions of a target application.

A further object of the invention is to permit existing translations of the instructions of a target application to be located as needed for the execution of a branch instruction more rapidly than before.

SUMMARY

In accordance with the foregoing objects and advantages, a digital processor (the "host processor") of the kind that dynamically translates instructions of a computer application program (the "target application") designed for processing by a "target processor", a digital processor with a different instruction set than the instruction set of the host processor, and executes the translated instructions in real time to carry out the purpose of the target application and stores such translations that are made within a searchable translation buffer along with the accompanying tags to the translation for later re-use in processing of the target application, is modified to include a cache for translations (and the accompanying tags) more limited in size than the translation buffer. The cache is indexed using a selected one of the tags, specifically the logical address ("EIP") of the target application instruction.

In one embodiment, the cache is a software cache, one defined by the operation of the software in a portion of the main memory of the host processor. The process is such that should a search of the cache fail to find the translation sought, then the search is repeated in the translation buffer. A second embodiment of the invention includes both a hardware cache formed of memory dedicated to look-ups of translations and, as a back-up, a software cache. The processor control is such that should a search of the hardware cache fail to find the translation sought, the search is continued in the software cache. Should the search of the software cache also fail, searching is continued, as in the first embodiment, in the translation buffer which stores all the translations, a "slow look-up" procedure.

One embodiment of the invention also includes a memory stack. Upon the occurrence of the translation of a target call instruction, the host address of the translation of the next instruction of the target application and the associated tags are "pushed" onto the stack. Thereafter, some future execution of a host processor return instruction may be executed which will compare in current target state with those of the stack, and, if there is a match, will then pop the top of the stack and jump to the host system address so popped from the stack. If the translation address at the top of the stack is not a correct translation, the processor checks a number of additional stack entries as a further attempt to find the correct translation.

Preferably the host processor employs very long instruction words ("VLIW"), that pack together a number of different instructions that are executed in parallel, permitting an application to be processed more quickly. As a benefit of such VLIW instructions, look-up of the next host instruction address may be accomplished simultaneously with the execution of the target branch instruction and other target instructions.

The foregoing and additional objects and advantages of the invention together with the structure characteristic thereof, which was only briefly summarized in the foregoing passages, will become more apparent to those skilled in the art upon reading the detailed description of a preferred embodiment of the invention, which follows in this specification, taken together with the illustrations thereof presented in the accompanying drawings.

DETAILED DESCRIPTION OF THE PREFERRED EMBODIMENTS

Figure 1:
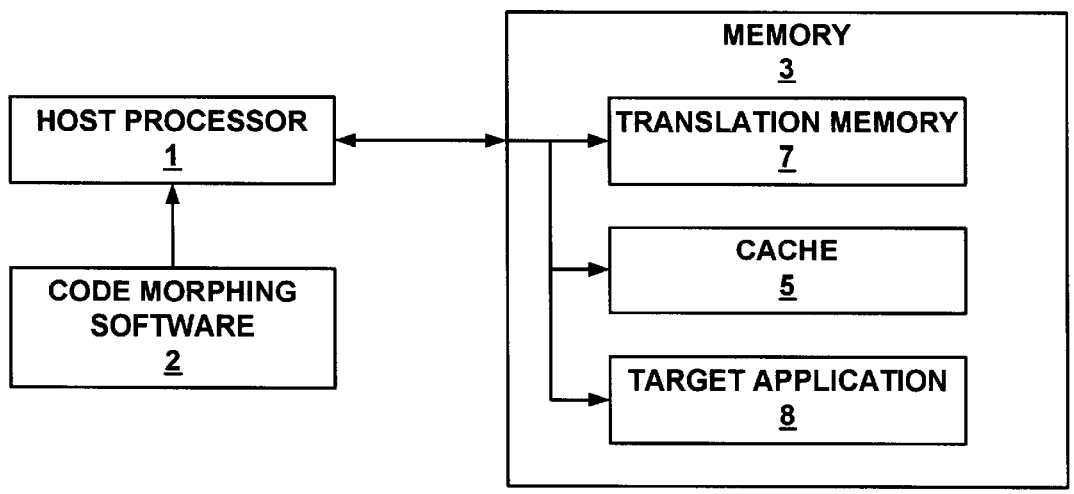
FIG. 1 is a block diagram of a host computer system that implements the invention.

FIG. 1, to which reference is made, generally illustrates in simplified block form the principal elements of the host processing system that implements the method of the invention. Those elements include host processor 1, its code morphing software 2 and the memory 3. Memory 3 is partitioned into multiple sections, including a cache memory ("cache") 5 and translation memory 7. A portion of memory 3 also stores the target application 8. Other regions of the memory and the processor that are not essential to the understanding of the invention are not specifically identified. The method makes use of a cache 5 that is reserved (defined) in the memory of the host processor by the code morphing software for storage of a fraction of the translations of target addresses and the respective accompanying tags for each respective translation. Translation memory 7, sometimes referred to as the translation buffer, holds all of the translations produced during the run of the target application program.

In a practical embodiment, cache 5 is organized as a two-way set associative cache with 2,048 sets, a recognized structure in the computer art; See Computer Systems Design and Architecture, Heuring & Jordan, published by Addison-Wesley 1997, subchapter 7.5"Cache". Because cache 5 is defined by software, the cache is referred to herein as the software cache. In a specific embodiment software cache 5 contains space for four thousand entries, substantially less than the tens of thousands of translations that accumulate and are stored during the operation of the '992 Transmeta processing system in processing a target application. Typically the cache is formed in the processor memory and is directly accessible to processor 1.

The translation memory 7 contains an entry for each translation compiled by processor 1 during the run of the target program. Translation memory or buffer 7, recognized as an element of the '992 Transmeta processor serves as a back-up to software cache 5, as later herein described.

A cache, as is known, offers the processor a faster means to access frequently used information in fewer clock cycles as compared to accessing conventional memory, such as the larger translation memory 7, for that information. In target processors cache is used for storing blocks of instructions or data from the more difficult to access main memory. By incorporating a cache in the '992 Transmeta processing system for the store of frequently used translation information, the dynamic translation process is accomplished in fewer system clock cycles than previously.

Figure 2A:
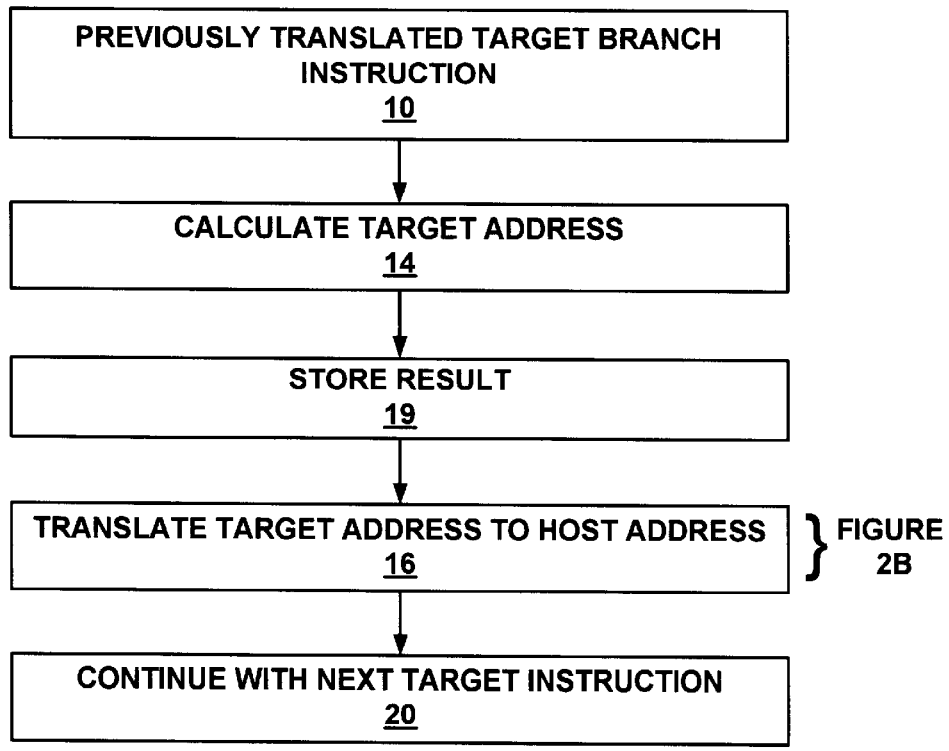
FIGS. 2A and 2B are flow charts illustrating the method implemented by the embodiment of FIG. 1.
Figure 2B:
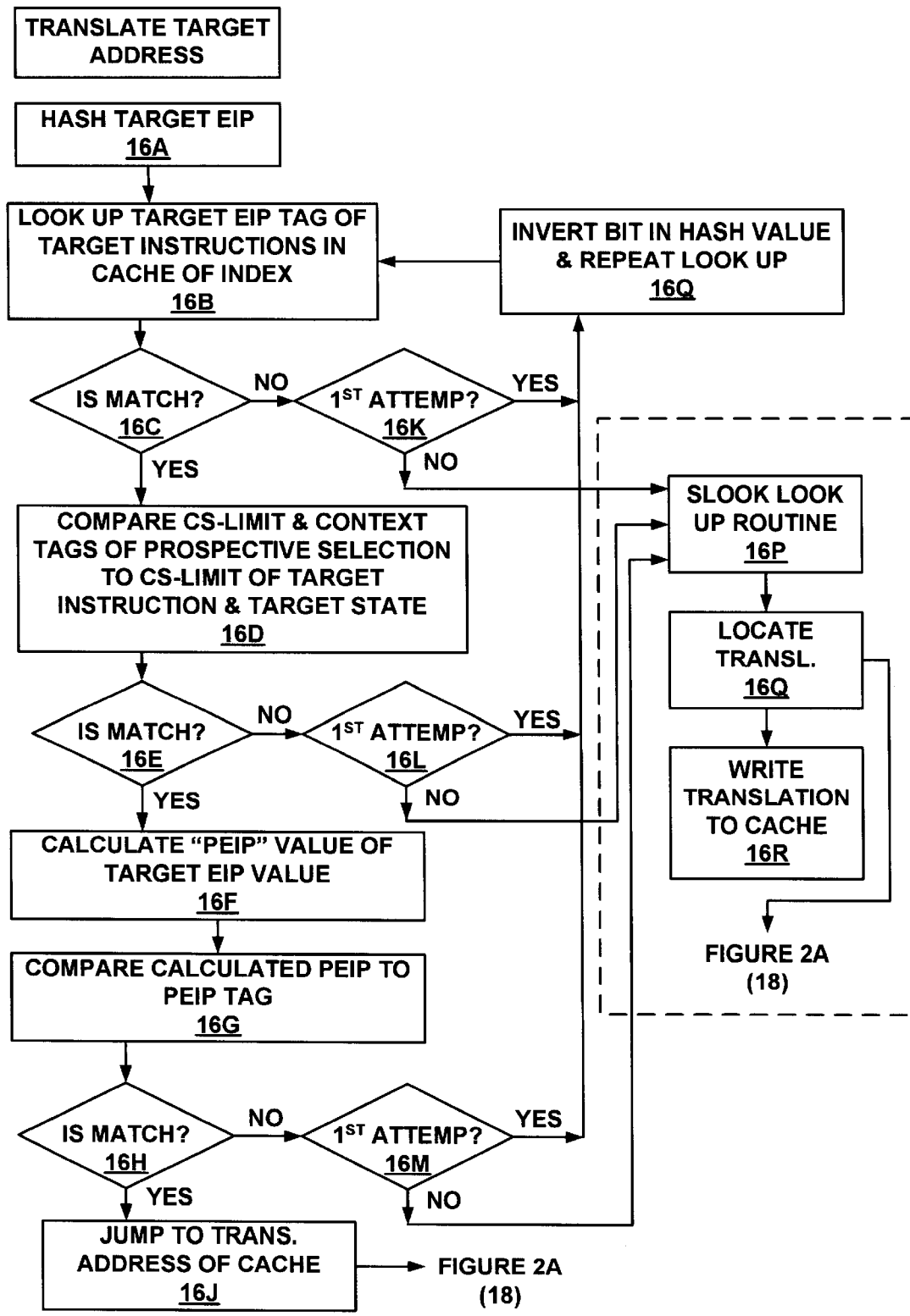

FIG. 2a and FIG. 2b define the new method for the dynamic translation process. Considering FIG. 2a, when the Transmeta processor is executing the instructions of a target application, one of the instructions of that program that will be executed is an indirect branch instruction. As represented in operation block 10, for this description of operation, the method begins with a translated branch instruction of the target application that was previously translated by the host processor. As a first step to execution of the branch, represented by block 14, the host processor calculates the target address for the branch instruction in the target processor environment, and the target address is stored 15. Then the calculated target address is translated by the processor into a host address as represented in block 16. The branch is then taken. Following the branch, processing continues with the next instruction of the target application, represented at block 20. The translation process is illustrated in greater detail in the flow-chart of FIG. 2b, later herein described.

During the execution of the target application, the host processor dynamically translated and stored various translations of TARGET instructions in the translation memory 7 (FIG. 1). The target address of a target application instruction thus has a counterpart host address in the translation and in the host instruction (e.g. the instruction translation). Ideally then, the translation of the target address of the target processor is accomplished by performing a look up of the previously stored information.

The look up or identification method may involve two subroutines. The first is called a fast look-up. If the first subroutine is unsuccessful, resort is made to the second sub-routine, the slow look-up of the prior art noted in the background to this specification. It is appreciated that the foregoing references to speed are relative to one another, the one being faster to completion than the slower one, and requires fewer system clock cycles to complete. Reference is made to FIG. 2B, which illustrates the steps involved in accomplishing the function of translation of block 16 through use of software cache 5.

Each translation of target application instructions stored in the translation memory 7 and in cache 5 includes or is accompanied by four different pieces of information of target processor "state", which are the tags earlier referred to. Those pieces include the extended instruction pointer ("eip") of the target application, which is the logical address of a target instruction, the physical instruction pointer ("peip"), which is the physical address of such instruction, the "context" of the TARGET processor being emulated as determined by the host processor, and the code segment limit ("CS-limit") of the TARGET processor.

When a target application instruction is successfully translated by the host processor during the processing of a target application, the translation is saved (stored) in translation memory 7 for re-use later during further processing of that application program. At the time such translation was made, certain working registers of the host processor applied to maintaining the indicia of target processor state held the assumed "state" or "context" of the target processor that is being dynamically emulated by the host processor just prior to dynamically compiling the instruction of the target application. That context information was saved along with the translation to ensure that the circumstances in the host processor are the same as before to help ascertain that the translation, if later accessed for use in processing, is one appropriate to the circumstances. Thus if the same target application instruction is again asserted for execution, the theory is that the context of the target processor would be the same as that which existed when that same target application instruction was originally translated and executed.

In a practical embodiment, cache 5 is sufficient in size to store four thousand entries. Each entry that is made into cache 5 by the processor contains the values of the four tags associated with a particular translation and the address of the code of the host processor that comprises the translation of the instruction of the target application. Initially, cache 5 is empty. During operation, cache 5 is the first location at which the processor "looks" for an address of a translation of a target application instruction being "looked-up" during a "fast look-up". If the translation is not found in the cache, the processor then looks for that information in translation memory 7. The latter process is the "slow look-up" procedure, earlier mentioned; a process that serves as a back-up, later herein described, to the fast look-up procedure of the invention. When the translation address is located in the translation memory 7, the processor, among other functions, copies the translation address, which was located, and the tags associated with that translation address into cache 5, providing an entry in the cache. Accordingly, during the initial processing operation, the processor of necessity makes a number of slow look-ups and writes translation addresses as entries in cache 5.

For the method of the present invention, the index to cache 5 is formed by hashing the lower order bits of the current "eip" tag to the translation. As example, the "eip" in a practical embodiment is thirty-two bits in length, whereas an index is typically only twelve bits in length. The low order bits are chosen for the indexing, since those bits are most likely to be more random in value that the higher order bits.

The fast look-up sub-routine computes the "hash" of the current "eip" (block 16A) of the target application instruction being executed. Using that hashed "eip", the sub-routine indexes the cache to locate an entry with the same hashed "eip" (as represented by operational block 16B) and checks for a match (decisional block 16C). If a match is found, evidencing a prospective translation, the subroutine then checks the CS-limit and context values associated with the target application instruction being asserted against the corresponding tags for the prospective entry selected (block 16D). If matches are found (decisional block 16E), the sub-routine computes the "peip" value of the target application instruction (16F) and compares the computed value with the "peip" tag of the prospective translation (16G). If the "peip" values match (16H), the sub-routine "jumps" to the host code (translation) address in the cache entry, block 16J.

If an "eip" match cannot be found (block 16C) or if the either of the other three tags associated with the asserted instruction fail to match the prospective translation (block 16C), the processor determines if the look-up was a first attempt, as represented at decisional blocks 16K, 16L and 16M, respectively. In each case, the Fast look-up subroutine inverts a "bit" in the hash value used to make the initial selection of a potential translation, and repeats the look-up as represented at block 16Q.

Inversion of a bit, e.g. changing a "1" to a "0" changes to the "paired" address. The approximately 4,000 addresses in the cache may be grouped into two 2,000 address sets. Each address of one group contains is an even number ending; the other an odd number, and the address of the even numbered set is regarded as paired with an address in the odd numbered set whose address differs by one unit. By changing the last bit of the address from the "1" to the "0", a switch is made to location of the paired address.

If the tags of the second entry matches the computed tag, the fast look-up software jumps to the address of the host code translation (block 16J) and executes the translation (FIG. 2A—operational block 18). If neither entry matches, the process automatically switches to a second sub-routine, earlier referred to as the slow look-up routine, and a slow lookup is made by that routine of the existing translations (block 16P), the translation is located (block 16Q), since the translation memory 7 contains all of the translations. The Slow look-up routine, as is recalled, is the basic memory search technique of the prior art earlier referenced.

When a translation is found using the Slow look-up sub-routine, the host instruction (translation) address and the associated tags are written into one of the two cache entries previously checked with unsuccessful result during the fast look-up routine (16R). Effectively that write-back ensures that the address of the translation will be located by the fast look-up routine should the same target application instruction address reoccur during continued execution of the target application.

It is also recognized that translation memory 7 may not contain the translation being sought. If the slow look-up procedure does not locate the desired translation of a target application instruction, execution continues by other means, including dynamic translation of the target instruction and the execution of that target application instruction, such as described in the cited Transmeta patent.

It should be appreciated that the foregoing hashed tag indexed cache (of the fast look-up) provides a faster means to obtain translations during processing that the slower search of the slow look-up routine. The foregoing method allows the processor to locate the correct translation of the target processor address that is the object of the branch instruction, and, hence, improves processing efficiency of the host processor in processing indirect branch instructions of the target application.

It is appreciated that a translation may, during the course of processing, prove invalid for a number of reasons. Should that be recognized by the processor it is necessary to mark that translation invalid, so the translation cannot be used thereafter (and necessitating re-translation of the instruction of the target application). When a translation that has a corresponding entry in cache 5 is invalid, the cache entry must be emptied. That is accomplished by writing "0" to the context tag in the entry, which cannot match any context tag. With a "0" as the context value, any look-up of a translation will result in a cache MISS, since the context of the target application instruction and that of the translation, by definition, cannot match.

Figure 3:
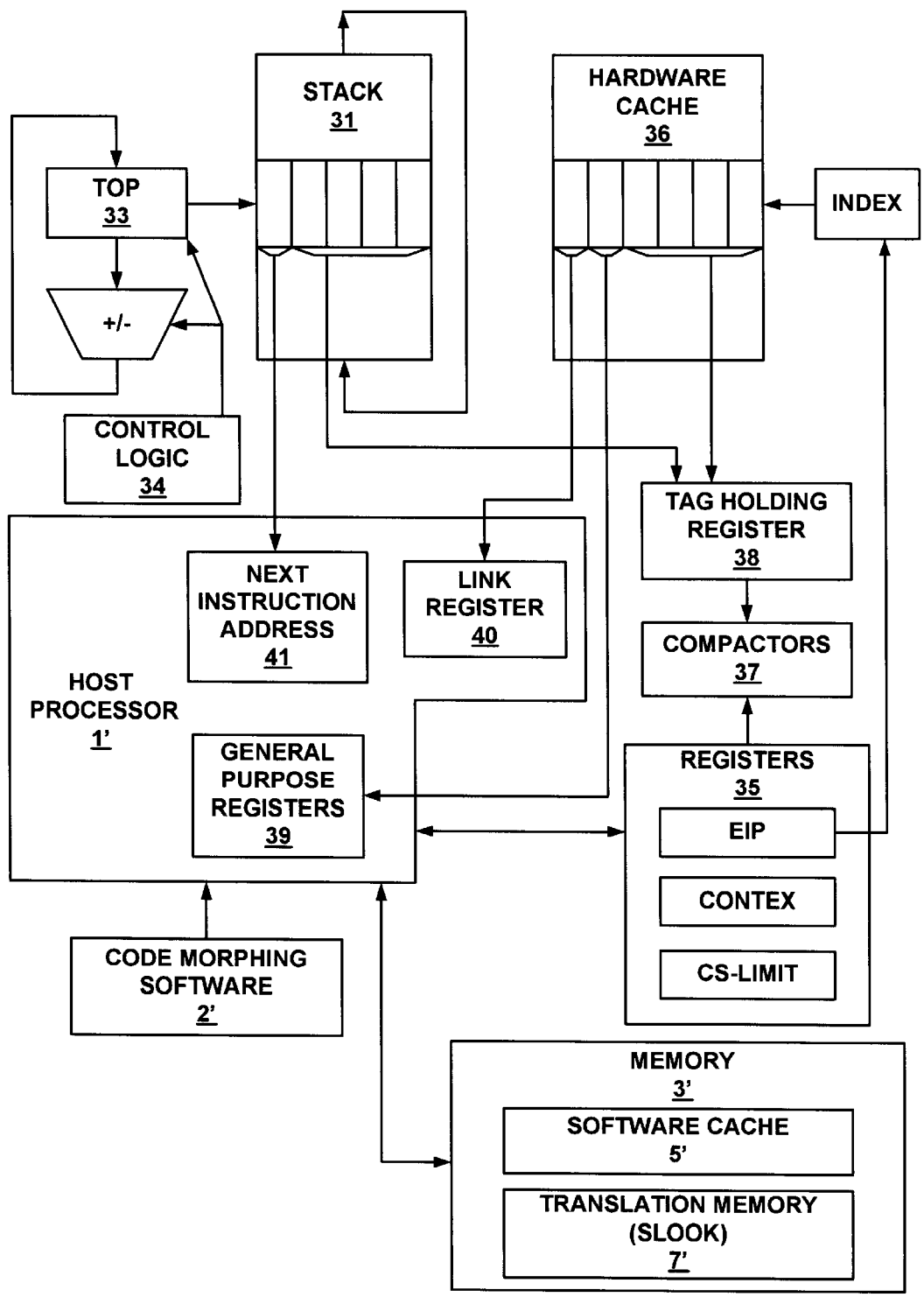
FIG. 3 is a block diagram of a host computer system that implements the second more improved embodiment of the invention.

The foregoing method is further improved, leading to even faster processing of branch instructions by including a hardware stack and a hardware cache. Reference is next made to the embodiment of FIG. 3. For convenience those elements of this embodiment which have equivalent elements in the embodiment of FIG. 1 are identified by the same numeral as in the prior embodiment, and are primed. Thus this embodiment includes the host processor 1' and its code morphing software 2', memory 3' which subsumes therewith the reserved sections for translation memory 7' and software cache 5'; and contains the target application 8'.

In this embodiment the procedure of looking-up host instructions that follow execution of a branch instruction (or of nested branch instructions) of the target program is also greatly enhanced over the foregoing software hash table approach by accomplishing a call and return procedure. As noted in the background to this specification, processors of the prior art contain a similar call and return procedure.

In this, additional hardware is incorporated within the processing system, including a RAM array 30, a data path formed of registers 35, 38 and 40 and comparators 37, and additional control logic 34. RAM array 30 is separate from memory 3'.

RAM array 30 is logically divided into two sections: The first portion serves as a memory stack 31, sometimes referred to as the return stack, which contains a group (or stack) of storage cells. The term cell, as used herein, is a unit of memory that holds a predefined number of digital bits, the data, defining at least an address and additional tag information, as later herein more fully described. The stack is organized as a circular buffer, as represented in the diagram by the return arrow line extending between the top and the bottom. Hence, if the number of entries written into the stack during operation exceeds the number of stack positions or cells, instead of an overflow, the additional entry is written into the first stack cell, overwriting any entry then present in the first cell, a procedure referred to as "wrapping" the stack. Still additional entries, if any, are written into the next succeeding cells of the stack, overwriting the respective earlier written entries found in those respective stack cells. In a specific embodiment of the present invention, the stack contains space for sixteen entries.

During processing of a indirect branch instruction of the target application, stack 31 holds the addresses of the "host" instructions of the host processor that the host processor is to return to and execute following execution of and return from a branch instruction.

The stack array 31 is organized like a stack using a pointer containing an index into the array. A stack (or "top") pointer 33 points to the "top" of the stack. By definition the cell location to which pointer 33 is pointing constitutes the "top" of the stack. The cell position within the stack for the WRITE by the processor or, alternately, as the case may be, from which an entry is to be READ by the processor during operation is the cell located at the top of the stack. Pointer 33 is a part of the control logic 34 That control logic includes a recirculating bi-directional counter. Data is "pushed" onto the stack by incrementing the pointer and writing into the cell in the array that is being pointed to by the pointer at that time. And data is "popped" off the stack by reading the cell pointed to by the pointer and then decrementing the pointer in preparation for any succeeding read operation.

The second portion of the RAM array is configured as a cache 36. The particular type of cache selected for this embodiment is direct mapped (see Heuring, Computer Design). A set associative cache (or any other kind of cache) may be substituted in the combination, if desired, without departing from the invention. In the specific embodiment here described the cache is sufficient in size to hold onehundred and twenty eight entries; and is indexed using the lower seven bits of the "eip", the target application extended instruction pointer (e.g. logical address) of an target application instruction, earlier herein described. Cache 36 is considerably smaller in size than cache 5'.

Datapath unit 32 contains a number of registers 35 for holding tag values for "eip", context and CS-limit values that correspond to current target system state, a number of comparators 37 for comparing data, and a register 38 (herein called the Tag Holding Register) to serve as a temporary repository of data, while comparisons are made. Each are logic devices of known structure. Control logic 34 of the fast look-up hardware contains the logic circuits, not illustrated, to define and practice the invention. The structure of the logic circuits becomes evident to those skilled in the art from the description of operation which follows and need not be illustrated as those details of conventional logic circuits do not aid one to understand of the invention.

Stack 31 implements a relatively fast look-up for return instructions of the host processor. Cache 36 implements a fast look-up for other kinds of indirect branch instructions. The cache is also used in circumstances in which the current context of the target processor has changed in an unpredictable way and a translation needs to be found that matches that current context.

Registers 35 of datapath unit 32 hold the current value of the target system context, the "eip" of the target processor and a representation of the CS limit of the target processor. Those values are written into the respective registers by the host processor 1' when a target application instruction is asserted for translation. The value of the context and the CS-limit changes during continued translation by the processor and the foregoing registers are updated routinely by the processor with the new values. The "eip" value is set by the processor in a register 35 of data path unit 32 when either cache 36 or stack 31 are to be used.

Each entry (or cell) in the stack 31 holds three of the four tag values, an address of the host processor to which a "jump" will be made if the entry is selected during the operation, and a valid bit. The "physical ip" (physical address) of the target processor is excluded from the entry for reasons hereafter described. The valid bit is included as a check on the validity of the host address. Typically that bit is "set" (e.g. "1") indicating that the translation is valid. For purposes of the following description it is presumed that the valid bit is set, but discussion in greater detail is deferred to a later point in this specification. Each entry in the cache 36, however, holds the four tag values and the address of the host processor to which a "jump" will be made if the entry is selected during the operation, and also holds the valid bit.

The "eip", context and CS-limit values of the target application instruction are held in register 35. When an entry in stack 31 or in cache 36 is to be examined, the corresponding tags of the entry are read into Tag Holding register 38. The processor then initiates the comparators 37 to compare the values in the Tag Holding register with the corresponding values in the tags of the prospective translation identified in register 35. For the check of the "peip" value, the processor transfers the tag into general purpose registers 39 and compares that in software to the computed "peip" value, computed from the eip value of the target application instruction.

The hardware cache of this embodiment has a like function and purpose to the cache previously described in the prior embodiment. Because it is separate hardware, look-ups may be accomplished more quickly than with the preceding embodiment. Cache 36 implements target processor transfers of control (jumps) in which one or more of the four tags are not known at the time the target processor code is translated, and which probably vary in value from one execution of the code to the next. Usually this includes the "eip" tag, but sometimes the context or CS-limit is not known (as example, after loading an X86 segment register).

The code of the host processor is contained in the translation of an instruction of the target application that causes such an indirect branch contains a number of elements or functions:

(1) Loading the target application instruction eip into the Fast look-up cache eip register 35 in data path 32;
(2). Issuing a instruction of the host processor to read the entry in cache 36 whose index is the low order seven bits of the "eip" value stored in register 35 (which implements the direct mapped cache look-up), setting the Tag Holding Register 38 to the "eip", context and "cs-limit" values read from the entry in cache 36 and reading the "phys-ip" from the entry in cache 36 into a register in general purpose registers 39.
(3) compares the tag in the Tag Holding Register with register 35 for a match;
(4) loads link register 40 with one of two alternative values, namely, either (4A) if the tags are found to match, loads the host address from the hardware cache; or, (4B) if the tags do not match, then loads the address of a recovery routine into the link register.
(5). Translating the eip value into the phys-ip value;
(7). Compare the peip calculated from the eip with the peip read from cache 36, and, if the two values do not match, jumping to the recovery routine; and
(8). Jump to the link register address either (a) to execute the matching translation or (b) to execute the fixed host processor routines.

The foregoing elements are wholly or partially included within the translated code (host instruction) of the target processor instruction or are wholly or partially included within fixed host processor routines that are "jumped to" by the translated code (translation). In the preferred embodiment of the invention, the first two elements are included within the translated code and the second two elements are included in the recovery code.

The recovery code implements the software fast look-up cache, which functions in the same manner as described in connection with the embodiment of FIG. 1, not here repeated. If the desired translation is found in the software fast look-up cache (by matching the tags associated with the address of a translation), then the hardware cache 36 is also loaded with the translation and associated tags of the translation and processing will jump to the address in the hardware Fast look-up cache entry and execute the translation (instruction) at that address.

If, however, the desired translation is located in the slow look-up routine hash table, then the translation that was identified is loaded from the translation buffer into both the hardware fast look-up cache 36 and software fast look-up cache 5'.

As earlier briefly noted, each entry in the cache includes a valid bit. If that bit is set to a digital "1", the entry is valid; if unset, a digital "0", then the bit is interpreted by the processor as invalid. On initialization of the host processor all of the valid bits associated with entries in the cache are marked invalid. Each entry written into the cache thereafter changes the associated bit to valid. Only entries having a valid bit of "1" can be successfully matched. When a translation is invalid, the valid bit for a cache entry of that translation, if any, should be set to "0".

The Fast look-up stack 31 operation is next considered. In operation stack 31 implements call and return instructions of the target processor. The translation of a target processor CALL instruction contains instructions of the host processor to create the effect of the call on the target processor state. That effect is to "push" the target processor return address onto the memory stack of the target processor. The translation also contains a "call" atom of the host processor. Execution of the call atom of the host processor is preceded by a WRITE of the target application instruction "eip", corresponding to the return address of the target processor, into the "eip" register 35.

Execution of the call atom of the host processor then "pushes" the foregoing "eip", the current target processor context and the CS-limit of the target processor(three of the four values constituting the "tag" to the translation) together with the address of the next instruction of the host processor (e.g. translation) onto stack 31 at the cell therein to which pointer 33 is pointing. The foregoing accumulation of data constitutes a single entry in the stack. Ideally the translation of the next target application instruction is accomplished by locating a pre-existing translation in the cache in the manner earlier described.

The code of the host processor that constitutes the translation of a call instruction of the target application (e.g. target application call instruction) accomplishes a number of functions: First the code execution (1) loads the "eip" of the target application instruction that follows the target call instruction into register 35; then (2) performs a "push" of the "eip" of the next target application instruction onto the target system stack, and perform any other side effects of the target system call instruction; (3) executes a host call instruction which pushes the "eip", context and CS-limit values stored in register 35 and the host address of the translation of the next target application instruction onto stack 31 (ie. increments TOP of stack 31 and writes the cited values into the stack entry which is being pointed to by TOP); and either (4A) continues processing of target system instructions at the destination of the target call instruction (ie. at the address included in the call instruction); or (4B), in the case of a target system call instruction that constitutes an indirect branch, follows the foregoing procedures earlier described for an indirect branch.

The code of the host processor that constitutes the translation of a return instruction of the target application (e.g. target application return instruction) accomplishes a number of functions: (1) First, "pop" the return "eip" off of host system stack 31 and load that "eip" into the "eip" storage in register 35; (2) perform any other side effects of the target system return instruction; (3) perform a host system return instruction that loads the tags from the top entry of stack 31 into Tag Holding Register 38; (4) compare (using comparator 37) the tags in Tag Holding Register 38 with the corresponding tags in register 35; either (5A), when the tags are found to match, load the host system address for the TOP of stack 31 into the "next instruction address" 41 storage located within host processor 1' and then "pop" the top of the stack; or (5B), when it is found that the tags do not match, raise a return mismatch exception; and (6) continue processing either at the next instruction address or at the return mismatch exception handler, as appropriate.

When (in the preceding step 5A) a match is found, the code (instruction) of the host processor found at that address is a translation of the target processor code found at the return address of the target processor. That code also checks the "phys-ip" of the target code that it translates is the same as the "phys-ip" that was computed from the current "eip", which is the fourth and last tag, not earlier checked by the return instruction of the host processor.

To ensure correct translation, each of the four elements of the translation tag must be checked for a match, and that check may be accomplished in either software or in hardware. Only three of the four elements were, as above described, "pushed" at the call site and checked at the return site. Computing the phys-ip of the target application instruction at the call site and at the return site is thought to require too many additional host instructions and to incur too great a latency before the call instruction could be issued and, hence, is not preferred and is not used. Hence, the check of the phys-ip is preferably made at this later stage.

If, however, the contents of the top of stack 31 do not match the loaded eip value, current context and cs-limit, the return atom takes a return mismatch exception. Control is then transferred to an exception handler, a software routine designed to deal with and resolve the problem. The exception handler for this exception examines ("looks at") the next two entries in the stack. If one of the entries matches the loaded "eip" value, current context value, and cs-limit value, the exception handler "pops" the stack a number of times until that matched entry is advanced to the top of the stack (e.g. the stack pointer is decremented to the matched entry); and initiates re-execution of the RET (return) instruction of the host processor. On re-execution the foregoing procedure repeats. This time, however, a match is made, whereupon the process completes as earlier described in the preceding paragraphs, and the next translated target application instruction is executed.

If the exception handler does not find an entry in the stack to match the value looked-up, the exception handler restores the top of stack 31 to its previous state and "pushes" a new entry onto the stack that does match. The foregoing push is accomplished by the exception handler by causing the processor to execute a host call atom. The instruction address contained in that entry is the address of the fast look-up cache code, earlier herein described. The return instruction is then re-executed (along with any other interrupted atoms as may be contained in the VLIW instruction) and control is transferred to the Fast look-up routine.

The operation of the foregoing look-up hardware (in the VLIW processor of the Transmeta processor system) can be accomplished in parallel with other operations associated with the indirect branch and with the target system instructions that preceded the indirect branch. The foregoing parallelism of execution contributes to the greater speed with which the hardware look-up system is able to accomplish a look-up more quickly than that of the software look-up system of the first embodiment.

As earlier described, stack 31 is finite in size. Should the number of entries "pushed" onto the stack exceed that size the stack will "wrap" around to the front or top of the stack and over-write prior entries. The effect of such wrapping is to later cause a failure to match an entry in the stack on a later RETurn instruction. Such a failure cannot cause an unrecoverable fault in processing, but merely causes an exception; and that exception is handled in the same manner earlier described on other failures to match an entry, allowing processing to continue.

It is seen that when popping the stack, it is not necessary to invalidate the entry that was popped from the stack, since the entry cannot be used if there is no match or is ultimately overwritten by a succeeding entry.

Entries in the stack that point to a translation that is no longer valid, that is invalid host processor code (instruction), must be invalidated so that code cannot be accessed from the stack. As example, the proper translation (host processor code) may have been overwritten. When a translation is invalid, it is necessary to invalidate any entries in the stack that refer to that translation.

As earlier briefly noted, each entry in the stack includes a valid bit. If that bit is set to a digital "1", the entry is valid; if unset, a digital "0", then the bit is interpreted by the processor as invalid. On initialization of the host processor all of the valid bits associated with positions in the stack are marked invalid. Each entry pushed onto the stack thereafter changes the associated bit to valid. Only entries having a valid bit of "1" can be successfully matched. When a translation is invalid, the valid bit for a stack entry for that translation, if any, should be set to "0".

When a valid bit of a translation is invalidated, one can mark only the valid bit in the stack entry associated with that translation, if any, as invalid. In the preferred embodiment, when an invalid translation is encountered, the valid bits associated with all the entries in the stack are marked invalid. The latter approach is preferred because the situation rarely occurs and the approach requires less circuitry than the former approach. In those rare occurrences, the invalidation of all the entries in the stack results in a marginal increase in processing latency for a very short time, since new entries will be subsequently entered into the stack during continued execution of the target application.

Some CALL instructions of the target processor may never be matched with an return instruction of the target processor that "pops" and uses the "eip;" that is "pushed" by the call. If the code morphing software of the host processor recognizes the foregoing circumstance, the code morphing software implements the target processor call without using a call of the host processor. An example of the foregoing is a call that simply jumps to the next target application instruction, usually provided in the program as a way of accessing the target application instruction eip.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus, the invention is to be broadly construed within the full scope of the appended claims.

What is claimed is:

1. The computer implemented method of retrieving a pre-existing translation of an instruction of a target application program in a host computer that dynamically translates and processes instructions of a target application program designed for processing by a target computer having an instruction set different from the instruction set of said host computer, comprising the steps of:

(a) creating a plurality of tags for each translation made of a target application instruction, a tag including multiple elements of data, including an extended instruction pointer ("eip") supplied by the target application; a physical instruction pointer ("peip") derived by calculation from said extended instruction pointer; the context of a target processor existing at the time the translation was produced by a host processor and the code segment limit ("CS-limit") of the target processor;

(b)(1) storing each said translation together with said associated tags as an entry within a memory, and (b)(2) storing a fraction of said translations and said tags associated therewith stored in said memory as entries in a cache;

(c) indexing said entries within said cache by hashing the information of the extended information pointers ("EIP") associated with said translations stored in said cache to form a hash table for said cache;

(d) hashing an eip of a target application instruction asserted for execution by the host computer and applying the hashed eip to a index to determine if said eip of said target application instruction matches an eip tag; of a translated target application instruction in said cache, wherein an individual translation in said cache may be selected through said hash table by matching the value of the EIP of a translation being sought with an EIP of said index; and (e) when said determination is positive, comparing the CS-limit of said asserted target application instruction with the CS-limit tag of the eip matched translated target application instruction, and comparing the context of the target processor existing in said host processor at the time of assertion of said target application instruction with and the context tag of said eip matched translated target application instruction;

(f) retrieving said translated target application instruction for execution when each of the foregoing comparisons produce a match;

(g) calculating the "peip" of said asserted target application instruction and comparing the calculated "peip" with the "peip" tag of said retrieved translated target application instruction, and if such comparison produces a match, then asserting said retrieved translated target application instruction as a correct translation;

(h) when said determination is negative or if any of the other of said tag comparisons results in a mismatch, generating a cache MISS exception; and (i) if a cache MISS exception is generated, conducting a search of said memory for the translated target application instruction of said asserted target application instruction.

2. The computer implemented method defined in claim 1 wherein said step of g) calculating the "peip" of said asserted target application instruction and comparing the calculated "peip" with the "pei p" tag of said retrieved translated target application instruction, and if such comparison produces a match, then asserting said retrieved translated target application instruction as a correct translation, further includes the step of:

jumping to the address of the correct translation and executing said correct translation.

3. The computer implemented method defined in claim 1 wherein said step of conducting a search of said memory for the translated target application instruction of said asserted target application instruction following the generation of a cache MISS exception, further comprises the steps of:

retrieving a correct translation of said target application instruction and accompanying tags from said memory; and writing said translated target application instruction and accompanying tags into said cache.

4. The computer implemented method of claim 1, wherein said step of (f) retrieving said translated target application instruction for execution when each of the foregoing comparisons produce a match, includes the step of:

copying the "peip" tag of said translated target instruction into a register; and wherein the step of (g) calculating the "peip" of said asserted target application instruction and comparing the calculated "peip" with the "peip" tag of said retrieved translated target application instruction, includes the step of:

comparing said calculated "peip" with the "peip" value registered in said register.

5. The method of storing and retrieving a selected stored translation of dynamically recompiled instructions of a target application program within a host processor of the type that dynamically recompiles instructions of said target application program and performs the function of said target application program by executing said translations, each target application program instruction including an instruction code and being associated with a plurality of tags, said tags comprising a logical address (eip), a code-segment limit value, and wherein a physical address (phys-ip) of said instruction code is derived by a calculation that incorporates said logical address, ffi(eip); wherein each translation of a target application instruction made by said host processor includes a context value produced by the host processor, said context value describing the state of the registers of a target processor existing at the time of the respective translation; and wherein each stored translation of said target application instructions includes a respective plurality of host tags, said host tags including said logical address (eip) of the respective target application program instruction; said physical address (phys-ip) of the respective target application program instruction; said code-segment limit value of the respective target application program instruction, and said respective context value of the target processor; comprising the steps of:

storing a plurality of translations including associated tags for said translations in a hardware cache, whereby each respective translation and tags associated therewith defines an entry of said hardware cache;

producing an index of the logical address tag of said target application program instructions in said cache, whereby an individual translation of a target application program instruction may be located within said cache through said index by applying a logical address of said individual translation to said index;

and wherein retrieval of an individual translation for a target application program instruction from amongst said stored translations in said cache, comprises the steps of:

applying the logical address of said target application program instruction to said index of said cache to determine if an entry in said cache contains an identical logical address; and if an entry in said cache contains the identical logical address that defines a prospective matched entry, comparing a code-segment limit tag of said target application program instruction with the code-segment limit tag of said prospective matched entry;

comparing a context tag of said target application program instruction with the context tag of said prospective matched entry; and, then calculating the physical address of said target application program instruction, and comparing said physical address of said target application program instruction with the physical address tag of said prospective matched entry; and if said code-segment limit tag, said context tag and said physical address tag of each of said target application program instruction and said prospective matched entry each match to define a matched entry , then accepting said entry as the translation of the individual target application program instruction; and upon failure to produce a match of said logical address of said target instruction and a logical address of said index or upon failure to produce a match for each of said context tag, said CS-limit tag, and said physical address tag, then producing an exception.

6. The method of locating a translation of an instruction of a target application, comprising the steps of:

establishing a memory containing a listing of all translations of instructions of said target application;

establishing a software cache containing a partial listing of translations of instructions of said target application;

maintaining a hardware cache containing a partial listing of translations of instructions of said target application;

searching said hardware cache for the translation of said instruction; and, if said translation is not located in said hardware cache, then searching said software cache for said translation of said instruction; and, if said translation is not located in said software cache, then searching said memory for said translation.

7. The method as defined in claim 6, wherein said step of searching said hardware cache comprises the steps of:

comparing the logical address of said instruction with a logical address; associated with each translation in said hardware cache, and, if a match is not made, proceeding to the next search, and, if a match is made with a logical address of a translation in said cache, accepting the translation associated therewith as a prospective translation of said instruction, and calculating the physical address of said instruction from said logical address, and comparing said calculated physical address of said instruction to a physical address tag associated with said prospective translation;

comparing said CS-limit of said instruction with the CS-limit tag of said prospective translation; and comparing the context associated with said instruction with the context tag associated with said prospective translation; and, if any of said comparisons fail to produce a match, then proceeding to the next search, and, if all of said comparisons result in a match, accepting said prospective translation as the translation of said instruction.

8. In a host digital processor that dynamically translates and executes instructions of a target application designed for processing by a target digital computer having a different instruction set from that of said host digital processor, the computer implemented method of processing target application call and return instructions, comprising the steps of:

determining if a target application instruction being translated constitutes a translation of a target application call instruction, and, if so, retrieving the next host instruction address in a target application program; and pushing said retrieved translated next instruction address together with a plurality of tags associated with said next translated target instruction address as an entry onto a stack, said plurality of tags comprising a logical address of a target instruction, a code-segment limit for said target instruction and a context value of a target processor associated with said target instruction;

determining if a target application instruction being translated constitutes a translation of a target application return instruction, and, if so, popping said translated next instruction address from said stack;

checking said tags associated with said translated next instruction address against the corresponding tags of the target application instruction address, and if the tags match; and jumping to said translated next instruction address and executing said next instruction.

9. The computer implemented method defined in claim 8, wherein said step of popping said translated next instruction address from said stack, further comprises the steps of:

jumping to the top of the stack pointed to by a pointer;

comparing a "eip" tag, a CS-limit tag and a context tag associated with the entry located at said top of the stack against the corresponding tags of the target application instruction, and if such comparison shows a match, retrieving said entry as the translated next instruction address; but if said comparison proves a mismatch;

decrementing the pointer to reposition the top of the stack comparing the "eip" tag, the CS-limit tag and the context tag associated with the repositioned entry located at said repositioned top of the stack against the corresponding tags of the target application instruction, and if such comparison shows a match, retrieving said first repositioned entry as the translated next instruction address; but if said second comparison proves a mismatch;

again decrementing the pointer to reposition the top of the stack a second time; and comparing the "eip" tag, the CS-limit tag and the context tag associated with the second repositioned entry located at said further repositioned top of the stack against the corresponding tags of the target application instruction, and if such comparison shows a match, retrieving said second repositioned entry as the translated next instruction address; but if said second third proves a mismatch, then generating an exception.

10. In a processor for dynamically translating and executing instructions of a target application designed for a different processor to accomplish the purpose of said target application, said processor including at least a processing unit and a memory for storing translations of target application instructions made for potential re-use during continued processing of said target application, the improvement comprising in combination therewith:

a cache for storing a fraction of the translations stored in said memory, said processing unit being programmed to check said cache for a desired translation when a target application instruction is asserted for execution before any check of said memory is necessitated, whereby a subsequent translation of an target application instruction during processing of said target application may be procured from said cache.

11. The processor as defined in claim 10, further comprising a plurality of tags for each said instruction, said tags comprising the eip of the target application instruction, the peip of the target application instruction, the CS-limit of the target application instruction, and the context of the target processor being emulated by a VLIW processor, and wherein each of said tags associated with a translation is stored in said memory accompanying said translation of said target application instruction.

12. The processor defined in claim 10, wherein said cache comprises a hardware cache, said hardware cache being separate from said memory.

13. The processor defined in claim 10, wherein said cache comprises a software cache, said software cache further comprising a reserved portion of said memory.

14. The processor defined in claim 12, wherein said improvement further comprises a hardware stack.

15. The processor as defined in claim 14, wherein said processor comprises a VLIW processor.

* * * * *